(12) United States Patent
Quevedo

(10) Patent No.: US 11,979,457 B2
(45) Date of Patent: May 7, 2024

(54) MANAGING NETWORK SERVICES USING MULTIPATH PROTOCOLS

(71) Applicant: F5 Networks, Inc., Seattle, WA (US)

(72) Inventor: Mark Ernest Quevedo, Issaquah, WA (US)

(73) Assignee: F5, Inc., Seattle, WA (US)

(*) Notice: Subject to any disclaimer, the term of this patent is extended or adjusted under 35 U.S.C. 154(b) by 0 days.

(21) Appl. No.: 17/091,093

(22) Filed: Nov. 6, 2020

(65) Prior Publication Data
US 2022/0150303 A1   May 12, 2022

(51) Int. Cl.
| G06F 15/16 | (2006.01) |
| G06F 15/173 | (2006.01) |
| H04L 45/24 | (2022.01) |
| H04L 67/101 | (2022.01) |
| H04L 67/1031 | (2022.01) |
| H04L 67/1038 | (2022.01) |

(52) U.S. Cl.
CPC .......... *H04L 67/1038* (2013.01); *H04L 45/24* (2013.01); *H04L 67/101* (2013.01); *H04L 67/1031* (2013.01)

(58) Field of Classification Search
CPC ............. H04L 67/1038; H04L 67/1031; H04L 67/101; H04L 45/24
USPC .......................... 709/230, 202–203, 223–224
See application file for complete search history.

(56) References Cited

U.S. PATENT DOCUMENTS

| 8,112,471 B2* | 2/2012 | Wei | H04L 67/56 |
| | | | 709/224 |
| 8,458,353 B2* | 6/2013 | Krishnaswamy | H04W 12/069 |
| | | | 709/231 |
| 9,172,756 B2 | 10/2015 | Ramachandran | |
| 9,674,054 B2 | 6/2017 | Scharf et al. | |
| 10,143,001 B2 | 11/2018 | Schliwa-Bertling et al. | |
| 10,476,992 B1* | 11/2019 | Amdahl | H04L 67/141 |
| 10,554,793 B2 | 2/2020 | Roeland et al. | |

(Continued)

FOREIGN PATENT DOCUMENTS

| EP | 3255845 A1 | 12/2017 |
| WO | 2017144123 A1 | 8/2017 |

OTHER PUBLICATIONS

F5 Networks, Release Notes : BIG-IP 11.5.0 LTM and TMOS Release Notes, available at: https://techdocs.f5.com/kb/en-us/products/big-ip_ltm/releasenotes/product/relnote-ltm-11-5-0.html#rn_new, Mar. 18, 2018.

(Continued)

Primary Examiner — Bharat Barot
(74) Attorney, Agent, or Firm — Troutman Pepper Hamilton Sanders LLP (F5 In-house)

(57) ABSTRACT

Technology related to managing network services using multipath protocols is disclosed. In one example, a method includes intercepting a multipath protocol request from a requesting host for a connection to a service. The multipath protocol request is intercepted by an intermediary server. A target host different than the intermediary server can be selected to provide the service. A multipath protocol packet can be sent from the intermediary server to the requesting host. The multipath protocol packet can add a subflow of the connection using an address of the target host. The subflow can enable a path between the requesting host and the target host that does not traverse the intermediary server.

20 Claims, 9 Drawing Sheets

(56) References Cited

U.S. PATENT DOCUMENTS

| | | | |
|---|---|---|---|
| 10,757,146 B2 | 8/2020 | Annamalaisami et al. | |
| 10,880,265 B1 | 12/2020 | Li | |
| 11,570,239 B2* | 1/2023 | Desmouceaux | H04L 45/24 |
| 2002/0143892 A1 | 10/2002 | Mogul | |
| 2007/0147258 A1 | 6/2007 | Mottishaw | |
| 2009/0180477 A1 | 7/2009 | Akahane | |
| 2010/0290468 A1 | 11/2010 | Lynam | |
| 2014/0040451 A1* | 2/2014 | Agrawal | H04L 67/56 709/224 |
| 2016/0140045 A1 | 5/2016 | Bergeron | |
| 2017/0195427 A1* | 7/2017 | Choquette | H04L 67/146 |
| 2017/0317920 A1* | 11/2017 | Rocquelay | H04L 45/24 |
| 2017/0373953 A1 | 12/2017 | George | |
| 2018/0041524 A1 | 2/2018 | Reddy | |
| 2018/0062979 A1* | 3/2018 | Zee | H04L 67/141 |
| 2018/0248714 A1* | 8/2018 | Milescu | H04L 45/24 |
| 2019/0068694 A1* | 2/2019 | Ripke | H04L 67/1004 |
| 2019/0182363 A1* | 6/2019 | Bonaventure | H04L 45/24 |
| 2019/0182367 A1 | 6/2019 | Kim | |
| 2019/0372937 A1* | 12/2019 | Song | H04L 63/0227 |
| 2020/0396267 A1* | 12/2020 | Petria | H04L 65/605 |
| 2021/0022041 A1 | 1/2021 | Allan | |

OTHER PUBLICATIONS

Ford et al., Request for Comments: 6824, TCP Extensions for Multipath Operation with Multiple Addresses, available at: https://tools.ietf.org/pdf/rfc6824.pdf, Jan. 2013.

Scharf et al., Request for Comments: 6897, Multipath TCP (MPTCP) Application Interface Considerations, available at: https://www.rfc-editor.org/rfc/pdfrfc/rfc6897.txt.pdf, Mar. 2013.

Extended European Search Report, dated Mar. 25, 2022.

\* cited by examiner

MANAGING NETWORK SERVICES USING MULTIPATH PROTOCOLS

FIELD

This technology generally relates to network traffic management, and more specifically to managing network services when the network traffic uses a multipath protocol.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: intercepting a multipath protocol request from a requesting host for a connection to a service, where the multipath protocol request is intercepted by an intermediary server. The method also includes selecting a target host different than the intermediary server to provide the service. The method also includes sending a multipath protocol packet from the intermediary server to the requesting host. The multipath protocol packet adds a subflow of the connection using an address of the target host. The subflow enables a path between the requesting host and the target host that does not traverse the intermediary server.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for managing network services using multipath protocols, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
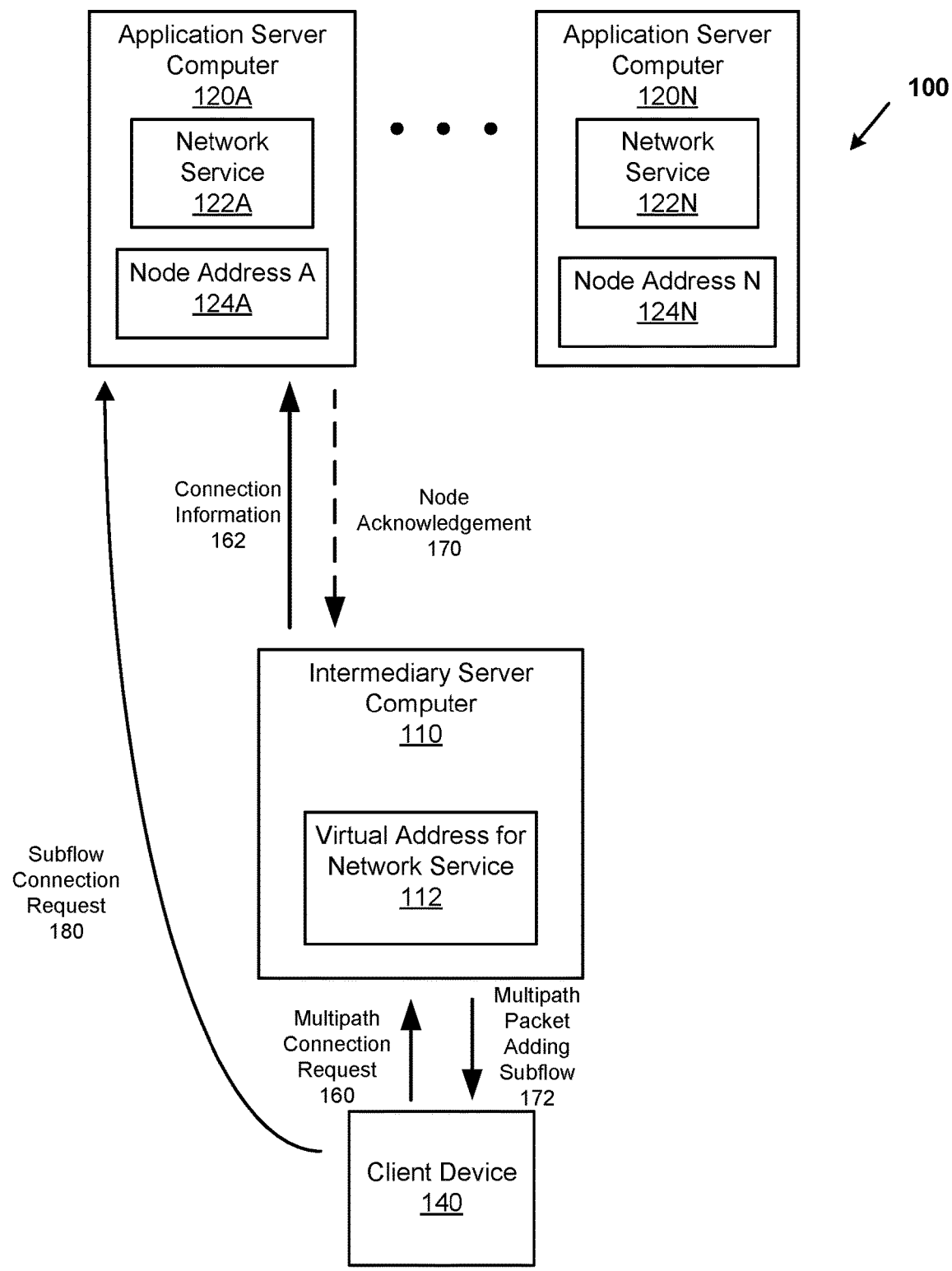
FIG. 1 is a block diagram of an example client-server architecture including an intermediary server computer that uses a multipath protocol.

As described above, software applications can be distributed or partitioned across different computing devices, such as by using a client-server, peer-to-peer, or other network computing architecture. Specifically, the computing, communication, and storage resources used to implement an application can be partitioned among different agents and/or devices. For example, the tasks of an application can be partitioned into network services and distributed among different server computers that communicate over an interconnection network. As one example, a network service can be a component of a distributed application that is accessible over a network and is accessed using an application layer protocol. For example, a network service can be implemented in a client-server or peer-to-peer architecture and can provide computational and/or storage functionality in response to requests to the service. Additionally, network services can perform maintenance, security, optimization, and other tasks of the network architecture. For example, network services can be used to encrypt and decrypt confidential information, protect against network attacks, maintain the correct operation of a network, and so forth.

One network architecture is a client-server architecture. For example, a client device can provide a user interface for a user of the application and allow a user to interact with the software application. Using the user interface, the user can enter data and/or commands that cause the client device to initiate a communication session with the application server computer, such as by sending requests over the network to the application server computer. The application server can respond to the request with content that can be rendered on the user interface at the client device. As one example, a client device executing a browser can request a web page from a web server and the web page can be displayed within a browser widow on a display of the client device. Another network architecture is a peer-to-peer architecture. In a peer-to-peer architecture, the peers can have the same or similar privileges and may perform similar types of tasks. For example, an application for predicting weather can be divided among different peer computers, where each computer performs a portion of the calculation. Each network architecture can also include intermediary agents that perform tasks that are in addition to client, server, or peer functions. For example, intermediary agents can include network devices for transmitting communications between peers, clients, and/or servers. Generally, an agent within a network architecture can be referred to as a node or a host. For example, a host can refer to a peer, a client, a server, or an intermediary agent. One way to specify a host is to provide one or more addresses identifying the host, where each address can be associated with a given network and/or protocol. A multi-homed host can have multiple addresses associated with the host.

An intermediary server computer can perform various proxy and other services by processing packets that transit the intermediary server computer. For example, the intermediary server computer can perform load balancing, rate monitoring, caching, encryption/decryption, session management (including key generation), address translation, denial-of-service (DoS) protection, and/or access control, for example. An intermediary server computer can act as a proxy for an application server. A proxy is an agent (e.g., a computer) that is situated in a path of communication between a client and a server (e.g., an application server) that can intercept communications (e.g., network packets, frames, datagrams, segments, and messages) between the client and the server. The proxy can perform various services, such as load balancing, rate monitoring, caching, encryption/decryption, address translation, and access control, for example.

The proxy can function as a virtual server that presents a network address of the proxy as the network address for the server application. For example, a client can request a service of the server by sending a request that is destined for the server application (e.g., using the network address of the virtual server as the destination address). The network address of the virtual server can also be referred to as a virtual address. The proxy can intercept the request on behalf of the server application. If the client is authorized to access the server application, the proxy can have the request forwarded to the server. Before forwarding, the proxy can modify the request from the client by changing the destination address to be the network address of the server computer. The application server computer can respond to the request from the client via the proxy. Specifically, the proxy can intercept the response from the server and modify the response by changing the source address of the response to be the network address of the virtual server. The response can then be forwarded to the client. In this manner, the proxy can be relatively transparent to the client and the server.

The proxy can add a layer of controls between the client devices and the server computers to potentially increase the availability, security, and/or performance of the client-server architecture. For example, the proxy can intercept all client traffic destined for the server computer and only allow the traffic to be forwarded after the client has been authenticated and/or authorized to access the server. However, the proxy may add latency to the transactions between the client and the server. The added latency can cause a network-based application to behave sluggishly, negatively impacting a user's experience with the application. For example, when a client is located in Seattle, an intermediary is located in Denver, and a server is located in Los Angeles, communications traversing the Seattle-Denver-Los Angeles path may cause undesirable latency in a network-based application.

A multipath communications protocol is a networking protocol with attributes that enable network packets of a network flow to traverse multiple different paths across one or more networks for a given sender and receiver. A network flow is a set of related packets. The related packets may share a common sender and receiver, and may share common values for packet header fields, such as a source port, a destination port, and/or a protocol identifier. A multipath protocol can divide a network flow into different subflows that can traverse different network paths. As one example, a multipath protocol can use different addresses of a multi-homed host to send packets along different network paths. Specifically, the receiver can have multiple addresses and the sender can send a first multipath protocol packet to a first address of the receiver along one network path and a second multipath protocol packet to a second address of the receiver along a different network path.

Multipath protocols can be connectionless or connection-oriented communication protocols. One example of a non-multipath connection-oriented communication protocol is Transmission Control Protocol (TCP). TCP can be used to set up a virtual connection between a source (e.g., a client) and a destination (e.g., a server) before sending data between the source and the destination. The connection is formed using a handshake of network packets between the source and the destination, and then data can be sent after the connection is formed. An example of a multipath protocol is Multipath Transmission Control Protocol (MPTCP). MPTCP is described in Request for Comments (RFC) 6824 and RFC 6897, available from the Internet Engineering Task Force (IETF). MPTCP can use TCP as a lower layer in a multipath protocol stack. Specifically, an MPTCP network flow can be divided into different subflows by using different TCP connections between a sender and a receiver, where each subflow uses a different TCP connection. An example of a non-multipath connectionless communication protocol is User Datagram Protocol (UDP). UDP can be used to send data without setting up a connection. Similar to MPTCP, a multipath protocol can use UDP, or another connectionless protocol, as a lower layer in a connectionless multipath protocol stack.

As described herein, an intermediary server and a multipath protocol can be used to manage network traffic of a network service. For example, the intermediary server can function as a virtual server that presents a network address of the intermediary server as the network address for the network service. A requesting host (e.g., a client device) can send a multipath protocol request to the virtual address of the network service requesting a connection to the network service. The intermediary server can intercept the multipath protocol request and perform various functions for the network service. For example, the intermediary server can perform authentication, authorization, and accounting (AAA) functions for the service, such as validating credentials from the requesting host and authorizing access to the network service. The intermediary server can perform a handshake with the requesting host to create a multipath connection to the network service. The network service can be implemented using a number of server computers, such as for increasing a number of users of the service and/or for partitioning tasks of the service among different servers. The intermediary server can select one or more target hosts for performing the service. For example, the selection can be based on a load of the servers or based on a service chain for providing the service. The intermediary server can provide a path for a subflow of packets to be transmitted between the requesting host and the target host of the network service. The intermediary server can perform tasks on behalf of the network service, such as encryption/decryption, compression/decompression, and/or additional tasks. The intermediary server can send a multipath protocol packet from the intermediary server to the requesting host that adds a subflow of the connection using an address of the target host. Specifically, the intermediary server can send a multipath protocol packet that enables a subflow of the connection that connects the requesting host to the target host that bypasses the intermediary server. The subflow through the intermediary server and the subflow bypassing the intermediary server can both be operational so that packets transmitted between the requesting host and the target host can take multiple paths. The subflow through the intermediary server can also be removed, using a multipath protocol packet, so that the latency associated with traversing the intermediary server can be eliminated. Using the example above, where a client is located in Seattle, an intermediary is located in Denver, and a server is located in Los Angeles, the latency associated with traversing the Seattle-Denver-Los Angeles path can be reduced by sending the packets between Seattle and Los Angeles and skipping the Denver intermediary. Accordingly, the intermediary server can be used to offload tasks to free up resources of the target server and/or the intermediary server can be bypassed to reduce a latency between the requesting host and the target host. By managing the different subflows using multipath protocol packets, trade-offs can be made between distributing functions of the network service across different computers and reducing latency.

Example Architectures for Managing Network Services Using Multipath Protocols FIG. 1 is a block diagram of an example client-server architecture 100 including an intermediary server computer 110 that uses a multipath protocol. Specifically, FIG. 1 illustrates how a client device 140 can connect to a network service 122 hosted on one or more application server computers 120A-N and how the network traffic between the client device 140 and the application server computers 120A-N can be managed using a multipath protocol. The client-server architecture 100 can include the intermediary server computer 110, the application servers 120A-N, communication network(s) (not shown), and the client device 140. The communication network(s) can include public and/or private networks. Information can be sent over the communications network(s) using packets, which can be categorized as requests, responses, and/or other types of messages. The client-server architecture 100 can be implemented using a client-server architecture as described in more detail with reference to FIG. 8, where the different components (110, 120, 140) of the client-server architecture can be implemented using a computing environment as described in more detail with reference to FIG. 9.

The client device 140 can be a computing device capable of sending and receiving multipath protocol network traffic over a communications network. For example, the client device 140 can be a mobile computing device, a desktop computing device, a laptop computing device, a tablet computing device, a virtual machine executing on a cloud-based computing environment, and so forth. The client device 140 can execute an agent (e.g., a browser or other software application) that requests a network service 122 provided by the application servers 120A-N. The agent can generate requests that are transmitted by the client device 140 using a multipath protocol. The multipath protocol can be a connectionless communication protocol or a connection-oriented communication protocol. As described in more detail with reference to FIG. 2, the multipath protocol can be layered over a single-path communication protocol, such as UDP or TCP.

The application server computers 120A-N can provide a pool of resources for implementing the network service 122. Each of the of the application server computers 120A-N can be computing devices capable of sending network traffic over a communications network and processing requests by client devices (such as the client device 140). Each of the of the application server computers 120A-N can be accessed using a respective address for the individual application server computer 120A-N. For example, the application server computer 120A can be accessed using node address A 124A, the application server computer 120N can be accessed using node address N 124N, and so forth. Each of the server computers 120A-N can include multiple hardware and/or software server resources, a virtual machine executing on a cloud-based computing environment, and so forth. Each of the application server computers 120A-N can execute one or more instances of the network service 122. For example, the application server computer 120A can execute the network service 122A, the application server computer 120N can execute the network service 122N, and so forth. The different instances of the network service can execute the same software application but may have different state associated with the different clients that are accessing the service. The network service 122 can include a variety of server software applications, such as an HTTP server application or a secure shell (SSH) server application, for example.

The intermediary server computer 110 can be a computing device capable of sending network traffic over a communications network using a multipath protocol. For example, the intermediary server computer 110 can act as a network traffic manager, an application delivery controller (ADC), and/or a proxy for the application server computers 120A-N to make the network service 122 available from public networks, such as the Internet. The intermediary server computer 110 can be associated with a virtual address 112 for the network service 122. Specifically, the intermediary server computer 110 can intercept network traffic that is addressed to the network service 122 using the virtual address 112. The intermediary server computer 110 can perform various functions on behalf of and/or in coordination with the network service 122. For example, the intermediary server computer 110 can perform various proxy and other services, such as rate monitoring, caching, denial of service protection, encryption/decryption, session management (including key generation), and/or address translation. As another example, the intermediary server computer 110 can perform authentication, authorization, and/or accounting (AAA) functions for the network service 122. As another example, the intermediary server computer 110 can manage the resources of the application server computers 120A-N, such as by balancing a computational and/or network load on each of the application server computers 120A-N.

The client device 140 and the application server computers 120A-N can communicate via one or more communication network(s) and/or the intermediary server computer 110. Requests from the client device 140 can be processed by and/or forwarded through the intermediary server computer 110 to one or more of the application server computers 120A-N. For example, the client device 140 can send a multipath request 160 to connect to the network service 122 by addressing the request to a virtual address 112 for the network service 122. The intermediary server computer 110 can intercept the connection request for the network service 122 and can perform a handshake with the client device 140 to create a connection between the client device 140 and the network service 122. The intermediary server computer 110 can select one of the application server computers 120A-N to provide the network service 122 for the client 140. The initial connection can include a subflow that passes through the intermediary server computer 110; specifically, the subflow can include the client device 140, the intermediary server computer 110, and the selected node from the application server computers 120A-N (e.g., application server computer 120A). The intermediary server computer 110 can provide the selected application server computer 120A with connection information 162 that was determined during the handshake between the intermediary server computer 110 and the client device 140. This information 162 can include one or more cryptographic keys, a shared secret, a token (also referred to as a connection identifier), and so forth. The selected node can send an acknowledgment 170 to the intermediary server computer 110 indicating that the connection information 162 was received by the selected application server computer 120A. After the initial connection is formed, the intermediary server computer 110 can send a multipath packet 172 to the client device 140 that adds another subflow between the client device 140 and the selected application server computer 120A. Specifically, the added subflow can omit the intermediary server computer 110, such as by providing the node address A 124A to the client device 140. The client device 140 can send a multipath subflow connection request 180 to the selected application server 120A. The client device 140 and the selected application server 120A can perform a handshake to complete the subflow connection. When two subflows are established, the client device 140 can send multipath protocol packets through either subflow to the selected application server computer 120A. As one example, the initial subflow including the intermediary server computer 110 can be removed so that the latency associated with traversing the intermediary server computer 110 can be removed from the path. As another example, the subflows can be weighted so that the higher latency path through the intermediary server computer 110 is used less often than the lower latency path that omits the intermediary server computer 110. For example, the weighting can be achieved by sending TCP window advertisements from the selected application server computer 120A. As a specific example, the subflow omitting the intermediary server computer can advertise a TCP window that is ten times larger than the subflow including the intermediary server so that approximately ten times the traffic goes through the subflow that omits the intermediary server computer 110. By retaining a trickle of traffic going through the intermediary server computer 110, accounting, performance, or other measures of the network traffic can be calculated by the intermediary server computer 110.

Figure 2:
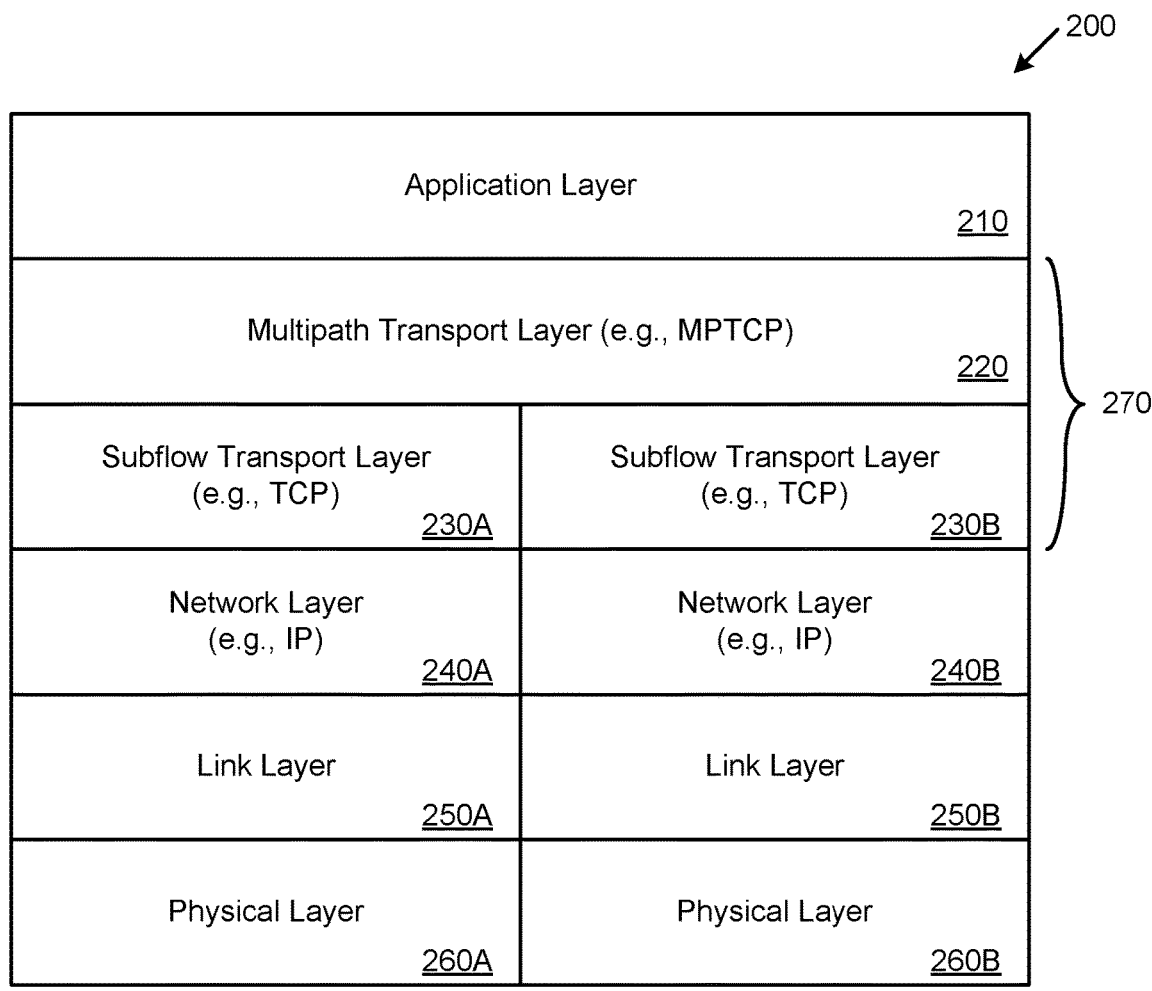
FIG. 2 illustrates an example network stack incorporating a multipath protocol.
Figure 3:
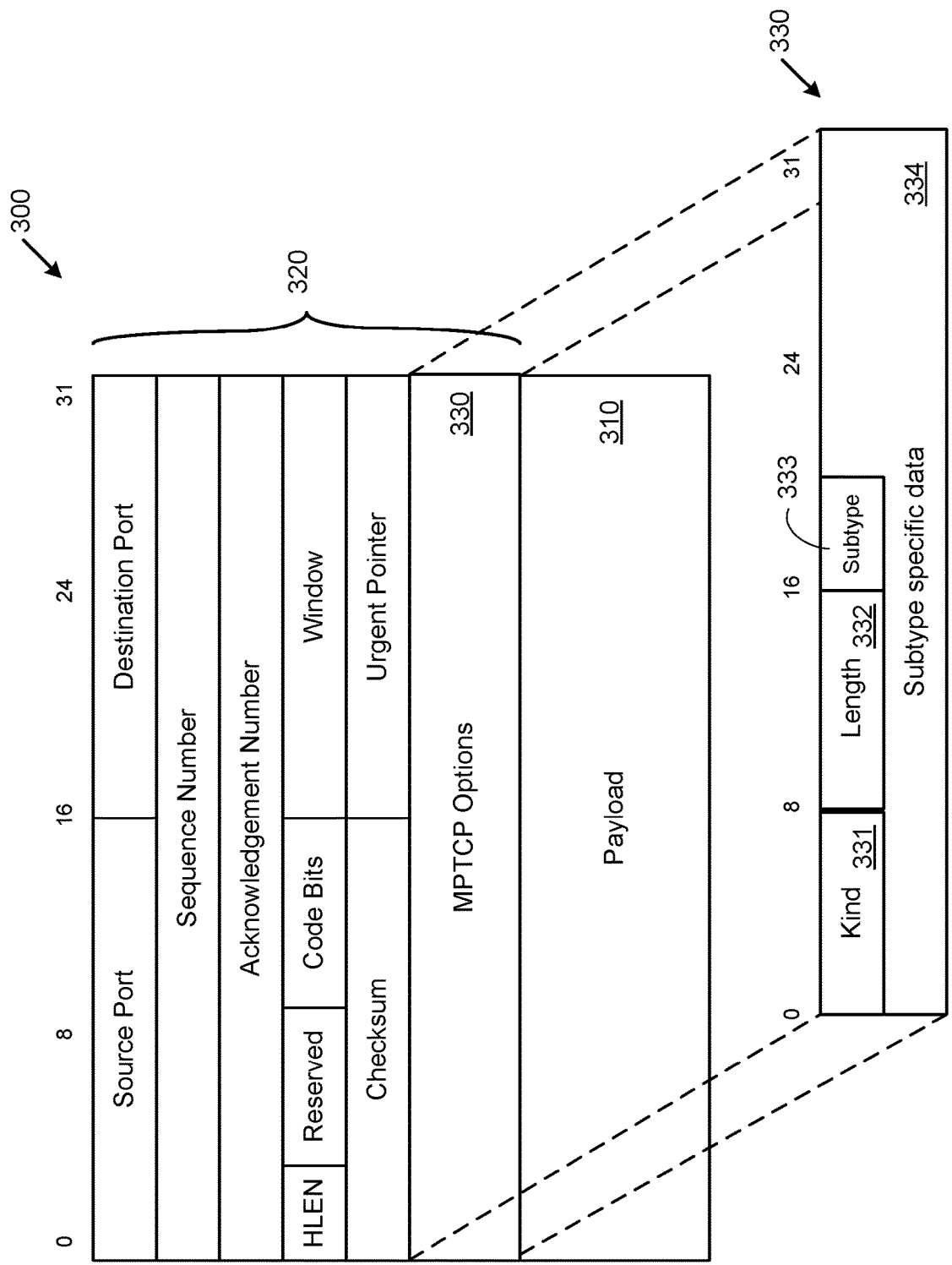
FIG. 3 illustrates an example multipath protocol packet format.

Communications of a multipath protocol can be specified using a network protocol stack and/or a packet format for communications of the multipath protocol. FIG. 2 illustrates an example network protocol stack that can be used to implement a multipath protocol, specifically, a multipath protocol implemented in a transport layer of the network stack. FIG. 3 illustrates an example multipath protocol packet format. Generally, a network protocol stack specifies how information is communicated between devices (e.g., across a network) that implement the network protocol stack. The network protocol stack can be partitioned into different layers that specify different aspects (e.g., communication protocols) of the communications system. Data can be sent between computing devices by encapsulating the data in network packets and forwarding the network packets from one device, through the network, and to another device. Network traffic is one or more network packets flowing through a network. The network packets can be formatted according to one or more communications protocols that can be specified by the different layers of the network protocol stack.

As one example, the layers within a network packet can be described using the Open Systems Interconnection (OSI) model which partitions the different functions of a communication system into respective abstraction layers. In particular, the OSI model partitions a communication system into seven layers. A particular layer provides a communication path with the layers adjacent (e.g., a layer above and a layer below) to the particular layer. The lowest layer is the physical layer (also referred to as layer 1 or L1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (also referred to as layer 2 or L2). The link layer defines the protocols for transferring data between two nodes. Additionally, the link layer can define protocols for establishing and terminating connections between nodes, managing flow control, and detecting and/or correcting errors occurring on the physical layer. Ethernet is an example of a link layer protocol. The link layer can provide a communication path with the network layer (also referred to as layer 3 or L3). An example network layer protocol is Internet Protocol (IP) (including IPv4 and IPv6). Other layers of the OSI model include the transport layer (also referred to as layer 4 or L4), the session layer (also referred to as layer 5 or L5), the presentation layer (also referred to as layer 6 or L6), and the application layer (also referred to as layer 7 or L7). It should be noted that a network packet (or simply a packet) generally includes a header used to address the packet to another entity (e.g., another service, a remote node, or another agent) at the layer of the packet and a payload having a discrete quantity of information. A packet addressing an agent at one layer can be encapsulated within a payload of a packet at a lower layer as the original packet transits the communication layers. A packet of the link layer can also be referred to as a frame. A packet of the transport layer can also be referred to as a datagram or a segment. The OSI model is a reference and some networking protocols may not strictly adhere to the seven layers of the OSI model. For example, in some embodiments, the functions of the link layer and the physical layer may be blended into a single link layer.

FIG. 2 illustrates an example network protocol stack 200 that can be used to implement a multipath protocol, specifically, a multipath protocol implemented in a transport layer 270 of the network stack 200. The network protocol stack 200 includes an application layer 210 that specifies a protocol for communicating information between two different hosts executing at the application level. For example, one host can be a client requesting data from a network service and the other host can be server of the network service that responds to requests from clients.

The transport layer 270 can specify protocols to enable a quality of service and accuracy of data delivery between hosts. As illustrated, the transport layer 270 can include a multipath transport layer 220 and one or more single-path transport layers 230A-B. The multipath transport layer 220 can implement the MPTCP protocol, for example. An MPTCP connection can provide a bidirectional communication channel between two hosts. The MPTCP connection can partition the channel among multiple subflows. MPTCP can be used to manage the MPTCP connection, such as by creating, removing, and utilizing the different subflows of the MPTCP connection. As illustrated, the MPTCP connection is partitioned among two different subflows 230A-B, where each subflow is implemented using TCP. In other examples, different numbers of subflows can be used and the subflows can be implemented by different protocols. By using a TCP layer below the MPTCP layer, the lower levels (e.g., 240A-B, 250A-B, and 260A-B) of the protocol stack 200 can be backwards-compatible with single-path communication protocols. An MPTCP connection can enable hosts to use different paths (e.g., subflows) with different network addresses (e.g., IP addresses) to exchange data over the MPTCP connection. Each of the subflows can use its own TCP connection to communicate data between hosts. As described in more detail with reference to FIG. 3, each of the subflows can be identified using option types of the TCP header.

It should be noted that while the multipath protocol is illustrated as being implemented in the transport layer in FIG. 2, the multipath protocol can be implemented at different layers within the protocol stack. It should also be noted that while the multipath protocol is illustrated as being a connection-oriented protocol in FIG. 2, the multipath protocol can also be implemented as a connectionless protocol.

FIG. 3 illustrates an example multipath protocol packet format 300. Specifically, the multipath protocol packet format 300 illustrates the transport layer of a multipath protocol packet. Higher layers of the packet (e.g., the application layer) can be encapsulated within the payload 310 of the packet. Lower layers of the packet can encapsulate the header fields 320 and the payload 310. The header fields 320 include fields that are compatible with TCP. The multipath protocol information can be provided in the MPTCP options field 330. The MPTCP options field 330 can be further divided into a kind field 331, a length field 332, a subtype field 333, and subtype specific data 334. The MPTCP options field 330 can be populated with a value that indicates the packet 300 is a MPTCP packet. For example, the Internet Assigned Numbers Authority (IANA) organization has specified that the value 30 in the kind field 331 can be used to indicate that a packet is a MPTCP packet. The length field 332 can be used to indicate a length of the subtype specific data 334. The subtype specific data 334 can be used to provide supplemental multipath information that varies based on the value in the subtype field 333.

The subtype field 333 can be used to indicate a function of the multipath protocol packet. For example, a value of 0 in the subtype field 333 can indicate that the packet is multipath capable (such as when initiating a connection); a value of 1 in the subtype field 333 can indicate that the packet is requesting to join a connection (such as when starting a new subflow for a connection); a value of 2 in the subtype field 333 can indicate that the packet includes a data sequence signal for allowing data to be reassembled reliably and in order (such as for combining data from multiple subflows into a single data stream); a value of 3 in the subtype field 333 can indicate that the packet includes an address to be added for a host; a value of 4 in the subtype field 333 can indicate that the packet includes an address to be removed for a host; a value of 5 in the subtype field 333 can indicate that the packet includes a request to change a priority of a subflow; a value of 6 in the subtype field 333 can indicate that the packet includes a request to fallback by removing a subflow or dropping back to TCP; and a value of 7 in the subtype field 333 can indicate that the packet includes a request to close a subflow within a multipath connection. Additional details about MPTCP are described in RFC 6824, available from the IETF. RFC 6824 is incorporated in its entirety by reference herein.

It should be noted that for ease of illustration, the multipath protocol packet format 300 is not drawn strictly to scale. For example, the payload 310, the MPTCP options 330, and the sub-type specific data 334 can vary in length based on various attributes of the packet. Additionally, while MPTCP has been used to illustrate a multipath protocol, MPTCP is but one example of multipath protocols and other multipath protocols can be used to implement the embodiments described herein.

Figure 4:
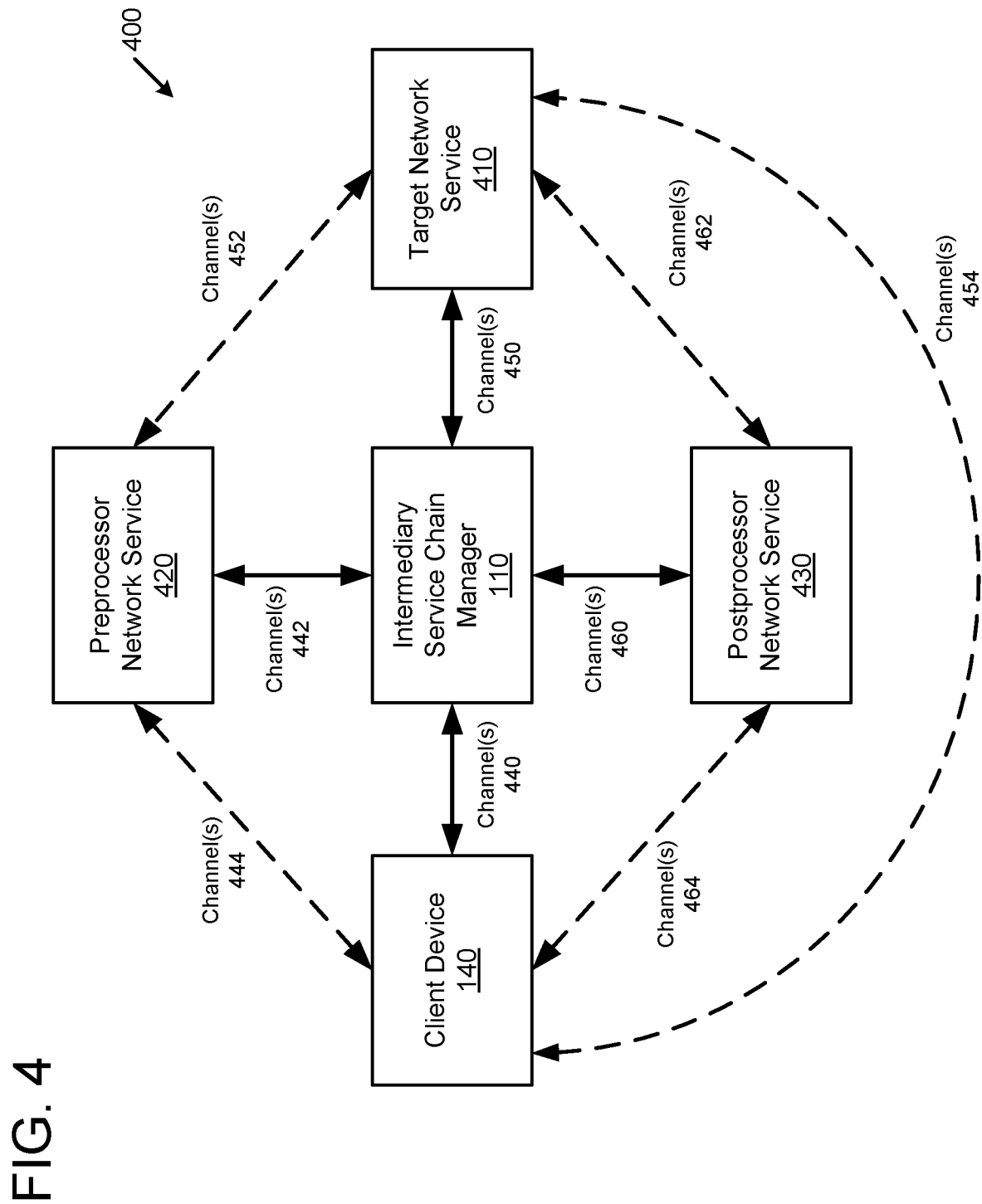
FIG. 4 is a block diagram of an example service chain for providing a network service.

FIG. 4 is a block diagram of an example service chain 400 for providing a network service to a client device 140. The network service can be implemented using a preprocessor network service 420, a target network service 410, and a postprocessor network service 430. As one example, the three services 410, 420, 430 can be pipelined so that all three services 410, 420, 430 are active concurrently. As another example, the three services 410, 420, 430 can operate sequentially, so that one service begins after the previous service ends. The preprocessor network service 420 and the postprocessor network service 430 may be transparent to the client device 140. For example, the client device 140 may be requesting the target network service 410, and the intermediary service chain manager 110 can determine that the preprocessor network service 420 and/or the postprocessor network service 430 are to be accessed prior to and/or after the target network service 410, respectively. It should be understood that while the service chain 400 is illustrated using three services, more or fewer services can be included in a service chain.

The intermediary service chain manager 110 (also referred to as merely a service chain manager) can be used to coordinate the communication between the client device 140 and the three services 410, 420, 430. Specifically, the service chain manager 110 can direct network traffic between the client device and the different services 410, 420, 430. The service chain manager 110 can be used to forward data between the different services 410, 420, 430. For example, data can be forwarded between the preprocessor network service 420 and the target network service 410 by using the service chain manager 110 as an intermediary for the communications. Similarly, the data can be forwarded between the target network service 410 and the postprocessor network service 430 by using the service chain manager 110 as an intermediary for the communications. The service chain manager 110 can present a virtual address for the network service, so that the client device 140 will initially connect to the network service via the service chain manager 110.

As one example, the three services 410, 420, 430 can be pipelined so that all three services 410, 420, 430 are active concurrently. For example, the preprocessor network service 420 can provide firewall functionality, the target network service 410 can be a video server, and the postprocessor network service 430 can be a compression engine for compressing video. The client device 140 can request a multipath protocol connection to the network service by sending a request over a communication channel 440 to the service chain manager 110. For example, the service chain manager 110 can manage a network address for a virtual server of the network service, and the request to access the network service can be addressed to the virtual address of the network service. A multipath protocol connection (e.g., an MPTCP connection) can be formed between the client device 140 and the service chain manager 110. The service chain manager 110 can determine that the preprocessor network service 420 is the first service to be accessed in the service chain to provide the network service to the client. Using the channel 442, the service chain manager 110 can create a multipath protocol connection between the preprocessor network service 420 and the service chain manager 110, so that requests from the client device 140 for the network service can be directed to the preprocessor network service 420 over the channels 440 and 442. The service chain manager 110 can provide connection information (e.g., a token, a shared secret, and/or a cryptographic key), associated with the multipath protocol connection between the client device 140 and the service chain manager 110, to the preprocessor network service 420. The service chain manager 110 can send a multipath protocol packet to the client device 140 adding an address of the preprocessor network service 420. The client device 140 can request to add a subflow to the multipath protocol connection to the network service, where the subflow creates a path over the channel 444 between the client device 140 and the preprocessor network service 420 that omits the service chain manager 110. The subflow including the path through the service chain manager 110 can be removed and/or deprioritized so that a latency of network traffic between the client device 140 and the preprocessor network service 420 can potentially be reduced.

Requests from the client device 140 can be processed by the preprocessor network service 420. The preprocessor network service 420 can generate data that is to be processed by the target network service 410. Initially, the preprocessor network service 420 may not have a direct communication channel to the target network service 410. The preprocessor network service 420 can request a connection to the target network service 410 by sending a request to the intermediary service chain manager 110. A multipath protocol connection can be formed between the preprocessor network service 420 the intermediary service chain manager 110 using the channel 442. The service chain manager 110 can create a connection to the target network service 410 by sending a request to the target network service 410 over the channel 450. Data can be communicated from the preprocessor network service 420 to the target network service 410 using the multipath protocol connection and the channels 442 and 450. The intermediary service chain manager 110 can provide connection information to the target network service 410. The intermediary service chain manager 110 can add an address of the target network service 410 to the multipath protocol connection between the preprocessor network service 420 and the service chain manager 110. The preprocessor network service 420 can request to add a subflow of the multipath protocol connection over the channel 452 to the target network service 410 that omits the service chain manager 110. The subflow including the path through the service chain manager 110 can be removed and/or deprioritized so that a latency of network traffic between the preprocessor network service 420 and the target network service 410 can potentially be reduced.

The target network service 410 can generate data that is to be processed by the postprocessor network service 430. Initially, the target network service 410 may not have a direct communication channel to the postprocessor network service 430. The target network service 410 can request a connection to the postprocessor network service 430 by sending a request to the service chain manager 110. A multipath protocol connection can be formed between the target network service 410 and the service chain manager 110 using the channel 450. The service chain manager 110 can create a connection to the postprocessor network service 430 by sending a request to the postprocessor network service 430 over the channel 460. Data can be communicated from the target network service 410 to the postprocessor network service 430 using the multipath protocol connection and the channels 450 and 460. The service chain manager 110 can provide connection information to the postprocessor network service 430. The service chain manager 110 can add an address of the postprocessor network service 430 to the multipath protocol connection between the target network service 410 and the service chain manager 110. The target network service 410 can request to add a subflow of the multipath protocol connection over the channel 462 to the postprocessor network service 430 that omits the service chain manager 110. The subflow including the path through the service chain manager 110 can be removed and/or deprioritized so that a latency of network traffic between the target network service 410 and the postprocessor network service 430 can potentially be reduced.

The postprocessor network service 430 can generate data that is to be sent to the client device 140. Initially, the postprocessor network service 430 may not have a direct communication channel to the client device 140. The postprocessor network service 430 can request a connection to the client device 140 by sending a request to the service chain manager 110. A multipath protocol connection can be formed between the postprocessor network service 430 and the service chain manager 110 using the channel 460. The service chain manager 110 can create a connection to the client device 140 by sending a request to the client device 140 over the channel 440. Data can be communicated from the postprocessor network service 430 to the client device 140 using the multipath protocol connection and the channels 460 and 440. The service chain manager 110 can provide connection information to the client device 140. The service chain manager 110 can add an address of the client device 140 to the multipath protocol connection between the postprocessor network service 430 and the service chain manager 110. The postprocessor network service 430 can request to add a subflow of the multipath protocol connection over the channel 464 to the client device 140 that omits the service chain manager 110. The subflow including the path through the service chain manager 110 can be removed and/or deprioritized so that a latency of network traffic between the postprocessor network service 430 and the client device 140 can potentially be reduced.

As another example, the three services 410, 420, 430 can operate sequentially, so that one service begins after the previous service ends. For example, the preprocessor network service 420 can provide authentication and authorization services, the target network service 410 can provide a primary service requested by the client device 140, and the postprocessor network service 430 can provide accounting services for the primary service. The client device 140 can request a multipath protocol connection to the network service by sending a request over a communication channel 440 to the service chain manager 110. For example, the service chain manager 110 can manage a network address for a virtual server of the network service, and the request to access the network service can be addressed to the virtual address of the network service. A multipath protocol connection (e.g., an MPTCP connection) can be formed between the client device 140 and the service chain manager 110. The service chain manager 110 can determine that the preprocessor network service 420 is the first service to be accessed in the service chain to provide the network service to the client. Using the channel 442, the service chain manager 110 can create a multipath protocol connection between the preprocessor network service 420 and the service chain manager 110, so that requests from the client device 140 for the network service can be directed to the preprocessor network service 420 over the channels 440 and 442. The service chain manager 110 can provide connection information (e.g., a token, a shared secret, and/or a cryptographic key), associated with the multipath protocol connection between the client device 140 and the service chain manager 110, to the preprocessor network service 420. The service chain manager 110 can send a multipath protocol packet to the client device 140 adding an address of the preprocessor network service 420. The client device 140 can request to add a subflow to the multipath protocol connection to the network service, where the subflow creates a path over the channel 444 between the client device 140 and the preprocessor network service 420 that omits the service chain manager 110. The subflow including the path through the service chain manager 110 can be removed and/or deprioritized so that a latency of network traffic between the client device 140 and the preprocessor network service 420 can potentially be reduced.

The preprocessor network service 420 can complete its functions and pass control to the target network service 410. Specifically, the preprocessor network service 420 can notify the service chain manager 110 that control is to be passed to the target network service 410. The service chain manager 110 can create a connection to the target network service 410 by sending a request to the target network service 410 over the channel 450. Data can be communicated between the client device 140 and the target network service 410 using the multipath protocol connection and the channels 450 and 440. The service chain manager 110 can provide connection information to the target network service 410. The service chain manager 110 can add an address of the target network service 410 to the multipath protocol connection between the client device 140 and the service chain manager 110. The client device 140 can request to add a subflow of the multipath protocol connection over the channel 454 to the target network service 410 that omits the service chain manager 110. The subflow including the path through the service chain manager 110 can be removed and/or deprioritized so that a latency of network traffic between the client device 140 and the target network service 410 can potentially be reduced.

The target network service 410 can complete its functions and pass control to the postprocessor network service 430. Specifically, the target network service 410 can notify the service chain manager 110 that control is to be passed to the postprocessor network service 430. The subflow including the path between the client device 140 and the service chain manager 110 can be re-added and/or reprioritized to the multipath protocol connection. The service chain manager 110 can create a connection to the postprocessor network service 430 by sending a request to the postprocessor network service 430 over the channel 460. Data can be communicated between the client device 140 and the postprocessor network service 430 using the multipath protocol connection and the channels 460 and 440. The service chain manager 110 can provide connection information to the postprocessor network service 410. The network service 410 or the service chain manager 110 can remove the subflow over channel 454 from the multipath protocol connection with the client device 140. The service chain manager 110 can add an address of the postprocessor network service 430 to the multipath protocol connection between the client device 140 and the service chain manager 110. The client device 140 can request to add a subflow of the multipath protocol connection over the channel 464 to the postprocessor network service 430 that omits the service chain manager 110. The subflow including the path through the service chain manager 110 can be removed and/or deprioritized so that a latency of network traffic between the client device 140 and the postprocessor network service 430 can potentially be reduced.

Figure 5:
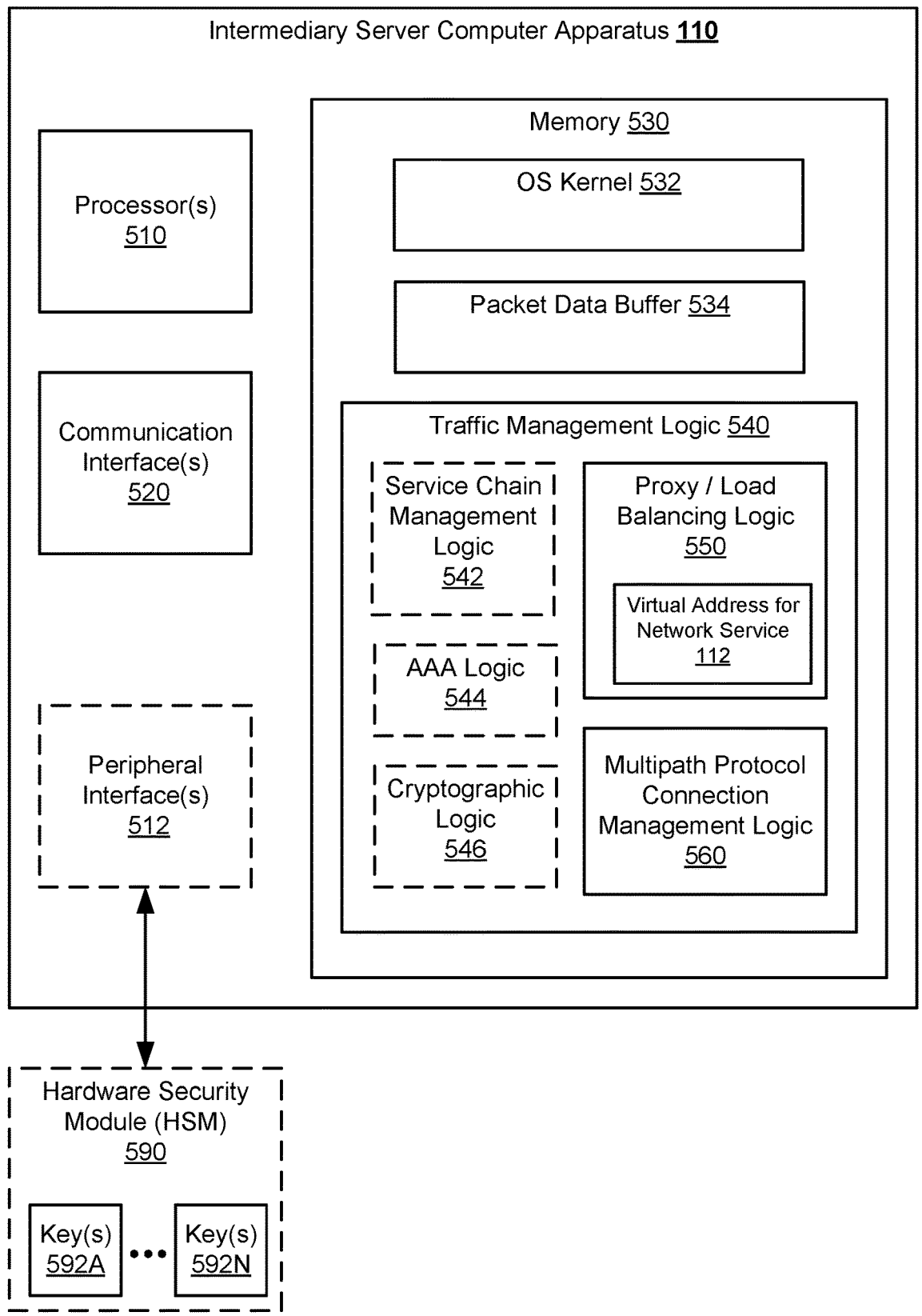
FIG. 5 is a block diagram of an example intermediary server computer, such as can be used for providing a network service using a multipath protocol.

FIG. 5 is a block diagram of an example intermediary server computer 110, such as can be used for providing a network service using a multipath protocol. For example, the intermediary server computer apparatus 110 can be a load balancer, an application delivery controller, a network traffic management system, or another component configured to be in a communication path between a client (e.g., client 140 of FIG. 1) and an application server (e.g., application server(s) 120A-N of FIG. 1) of a client-server architecture. The intermediary server computer apparatus 110 can be implemented using a computing environment as described in more detail with reference to FIG. 9.

The intermediary server computer apparatus 110 can include one or more processor(s) 510, one or more communication interface(s) 520, one or more optional peripheral interface(s) 512, and memory 530. The processor 510, communication interface 520, peripheral interface 512, and the memory 530 can be coupled together with an interconnect (not shown) so that the components of the computer apparatus 110 can communicate with each other using the interconnect. The communication interface 520 can be used to send and receive communications (e.g., network packets) with other computing devices, such as a client and an application server. The peripheral interface 512 can be used to communicate with local peripherals of the intermediary server computer apparatus 110, such as an optional hardware security module xxx. The processor 510 can be used to execute computer-executable instructions that are stored in the memory 530 and/or storage resources (not shown). The computer-executable instructions can be organized into software routines (also referred to as modules or components)

comprising executable code to perform various computing tasks. It should be noted that while FIG. 5 illustrates one organization of routines, other organizations are possible. For example, the illustrated routines can be sub-divided into smaller routines and/or combined into larger routines. The memory 530 can also include structured and/or unstructured data that is used by the software routines to perform the computing tasks.

The operating system (OS) kernel 532 can include different software routines for managing different aspects of the execution of programs and for interfacing with the hardware of the intermediary server computer apparatus 110. For example, the OS kernel 532 can manage the loading and removal of software applications and other routines into the memory 530 of the computer apparatus 110; the OS kernel 532 can manage storage resources of the computer apparatus 110; the OS kernel 532 can manage processes and/or threads executing on the processor 510; the OS kernel 532 can manage power states of the computer apparatus 110; the OS kernel 532 can provide an interface for applications and other routines to send and receive communications (e.g., network packets) using the communications interface 520; the OS kernel 532 can manage the transfer of information to and from the peripheral interface 512; and the OS kernel 532 can enable inter-process communication between different routines executing on the computer apparatus 110.

The traffic management logic 540 can include different software routines and/or hardware circuitry for controlling the network traffic transiting the intermediary server computer 110 by performing various proxy and other services, such as load balancing, rate monitoring, caching, encryption/decryption, TLS session management (including key generation), address translation, traffic forwarding, traffic buffering, and/or access control, for example. For example, the traffic management logic 114 can buffer network traffic (such as in the packet data buffer 534) that is to be processed and/or forwarded over a private or public network to a client, server, or other host. The traffic management logic 540 can include computer hardware, software, or a combination thereof. As illustrated, the traffic management logic 540 is implemented as software (e.g., executable software fully or partially stored in the memory 530). As one example, the traffic management logic 540 can include a multi-threaded real-time software routine. For example, the traffic management logic 540 can include a software daemon executed by a processor of the intermediary server computer 110. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task. As another example, the traffic management logic 540 can include a hardware co-processor that is tuned for performing operations to process packets as disclosed herein. The computer hardware can include circuitry that is fabricated for a single purpose and/or configurable circuitry that is programmable, such as a field-programmable gate array (FPGA).

The traffic management logic 540 can be organized in various different ways. As illustrated, the traffic management logic 540 can include proxy and load balancing logic 550, multipath protocol connection management logic 560, and optional service chain management logic 542, AAA logic 544, and cryptographic logic 546.

The proxy and load balancing logic 550 can perform operations on behalf of a network service. For example, the proxy logic 550 can present a virtual address 112 for the network service and can intercept requests for the network service. Specifically, requests for the network service can be addressed to the virtual address 112 and the proxy logic 550 can receive and process the requests. The proxy and load balancing logic 550 can maintain and/or access a database that tracks various performance criteria of the application servers that perform the operations of the network service. For example, a number of client connections, an amount of processor loading, an amount of available network bandwidth, and/or other performance criteria can be measured and tracked for each of the application servers. The proxy and load balancing logic 550 can select one of the application servers for an incoming request. For example, the proxy and load balancing logic 550 can select an application server that is lightly loaded or less loaded than other application servers according to the performance criteria. In other words, the selection of the application server can be based on a measure of the performance criteria. The proxy and load balancing logic 550 can receive responses from the application server and forward the responses to the client devices. The proxy and load balancing logic 550 can perform various other tasks on behalf of the application servers and/or the clients, such as encryption and/or decryption, caching of content, compression and/or decompression, access control, address translation, and so forth.

The multipath protocol connection management logic 560 can be used to manage multipath protocol connections between hosts requesting and providing the network service and hosts the act as intermediaries between the requestors and the providers. Generally, the multipath protocol connection management logic 560 can be used to create and remove multipath protocol connections and can manage (e.g., add, remove, and change) subflows within the connections. For example, the multipath protocol connection management logic 560 can receive a request to create a connection and can perform a handshake with the requestor to create the connection. The initial connection can be between the intermediary server computer 110 and the client device. The multipath protocol connection management logic 560 can add an application server to the connection in a transparent and/or nontransparent manner. For example, all communications between a client and server may initially go through the intermediary server computer 110 and so the client may be unaware of an identity of the application server providing the network service. The multipath protocol connection management logic 560 add a subflow to the connection that creates a subflow between the client and server that omits the intermediary server computer 110. The multipath protocol connection management logic 560 can delete and/or reduce a priority of the subflow through the intermediary server computer 110 so that the latency associated with going through the intermediary server computer 110 can be reduced and/or eliminated.

The service chain management logic 542 can be used to orchestrate a service chain of component network services to create a more comprehensive network service, such as described above in more detail with reference to FIG. 4. Generally, the service chain management logic 542 can maintain a directory of addresses for the component services and can act as a proxy for each of the component services. Accordingly, any of the component services can access a different component service by sending a request to the service chain management logic 542, and the service chain management logic 542 can act as an intermediary between the services. The service chain management logic 542 can also manage subflows between the services, such as to create more direct paths between the services without the service chain management logic 542 being in the subflow, for example.

The AAA logic 544 can perform authentication, authorization, and accounting functionality for the network service. Authentication is the process of verifying that an identity of an entity is genuine. Authorization is the process of verifying whether an entity (e.g., an authenticated entity) has the right to access a protected resource. Authentication and/or authorization can be performed using the AAA logic 544 and/or an additional service. For example, one way to perform authentication is to request credentials, such as a user identifier (e.g., a username or email address) and a password from an entity seeking access to a computer system. The AAA logic 544 can request credentials from a host and compare the credentials or a cryptographic transform (e.g., a cryptographic hash value) of the credentials to a list of authentic credentials for the network service. As another example, the AAA logic 544 can redirect a host to an identity provider service, which can perform the authentication of the host. In one embodiment, the AAA logic 544 can create a multipath protocol connection to the requesting host and then add a subflow of the connection to the identity provider service. The accounting functionality can include limiting and/or recording an amount of bandwidth used by a host, a number of accesses by a host, and so forth.

The cryptographic logic 546 can include logic for performing cryptographic operations. For example, cryptographic operations can be used for encryption, decryption, and key generation. Specialized security hardware circuitry can potentially increase a performance of computationally expensive cryptographic operations. As one example, the cryptographic operations can be performed in conjunction with security hardware circuitry, such as a hardware security module (HSM) 590. An HSM is computer hardware and/or software (e.g., a computing device) configured to store cryptographic keys, perform cryptographic operations (such as generating keys, encrypting data, and decrypting data), and enforce a security policy for using and/or accessing the cryptographic keys. For example, an HSM can include electronic circuitry for pipelining and/or accelerating various cryptographic algorithms. An HSM can include a physical enclosure that reduces a likelihood of observing and/or tampering with sensitive data, such as private keys of the server. For example, the enclosure can cover potential electrical probe points and display visible damage if the enclosure is tampered with. An HSM can enable and/or deny access to a key according to a security policy. For example, the security policy can specify that a particular key can only used and/or accessed when authorized account credentials are presented to the HSM. Accordingly, using an HSM can potentially increase a confidentiality and security of the information stored on the HSM and can potentially increase a performance of a system using the HSM. The intermediary server computer 110 can be the primary or only interface to the HSM 590 so that keys (e.g., keys 592A-N) and other cryptographic data are isolated and therefore more protected than compared to distributing the cryptographic data throughout a distributed computing system.

Hardware security modules can be implemented using various different computer architectures. For example, the HSM 590 can be implemented as a plug-in circuit card that interfaces to an input/output or peripheral interface 512 (such as a Peripheral Component Interconnect Express (PCIe) interface) of the intermediary server computer 110 and can include a connector for connecting to a backplane or other connector of the intermediary server computer 110. As another example, an HSM can be implemented as a computer appliance that is connected over a computer network (a network-based HSM can also be referred to as a netHSM). As another example, an HSM can be implemented as a virtualized resource within a cloud-computing infrastructure (a cloud-based HSM can also be referred to as a cloudHSM). HSMs can have different storage capacities and/or acceleration capabilities. For example, a physical HSM can be divided into multiple logical HSMs, where each logical HSM can have different capabilities and can be accessed using different account credentials. A logical HSM can also be referred to as a partition or token of the physical HSM. Partitions of the HSM can be isolated from each other so that keys and data on one partition are not visible from a different partition. Partitions can share hardware and other resources or the partitions can use specific unshared hardware and resources. An HSM can use various storage technologies, such as random-access memory (RAM), non-volatile RAM, FLASH memory, a hard-disk drive, a solid-state drive, or other storage implementations.

Example Methods of Managing Network Services Using Multipath Protocols

Figure 6:
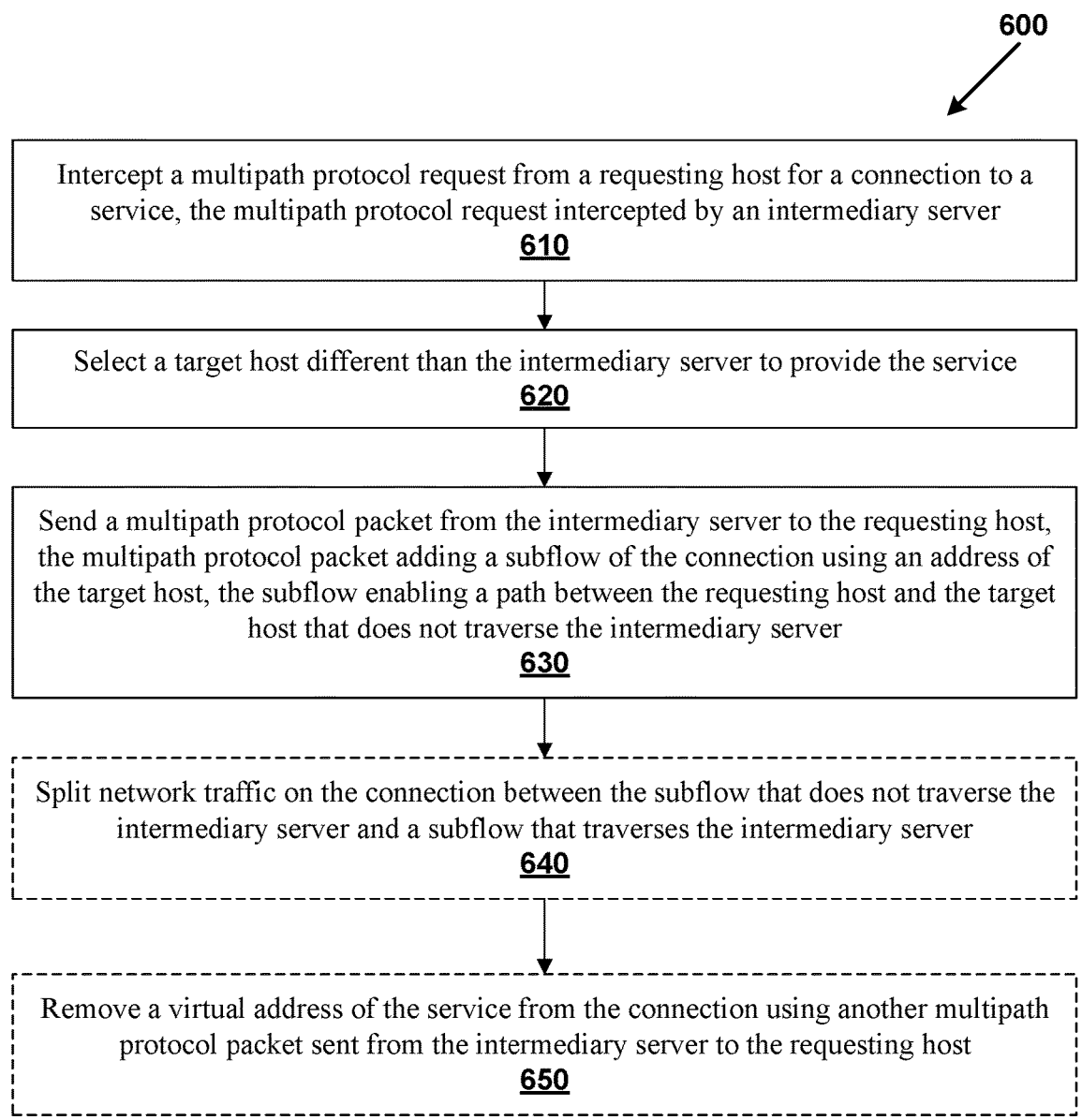
FIG. 6 is a flowchart of an example method for managing a network service using a multipath protocol.

FIG. 6 is a flowchart of an example method 600 for managing a network service using a multipath protocol. The method 600 can be implemented using the architecture 100, such as described above in reference to FIGS. 1-5. As one example, computer-executable instructions for carrying out the method 600 can be stored in computer-readable memory (e.g., the memory 530) and the instructions can be executed by one or more processor(s) (e.g., the processor 510) to perform the method 600.

At 610, a multipath protocol request can be intercepted from a requesting host for a connection to a service. For example, the multipath protocol request can be intercepted by an intermediary server that is assigned a virtual address of the service. The intermediary server can perform a handshake with the requesting host to create the connection to the service. During the handshake, various parameters of the connection can be negotiated, such as whether encryption is to be used, what encryption key(s) to use (if encryption is used), the value of a shared secret, the value of a session identifier, and so forth. The intermediary server can be a proxy for the service by intercepting network traffic that flows between the requesting host and the service.

At 620, a target host different than the intermediary server can be selected to provide the service. For example, the target host can be selected from a pool of hosts. Operational criteria of the hosts can be maintained, such as central processing unit (CPU) loading, network usage, number of client connections, and so forth. The target host can be selected from the pool of hosts based on the operational criteria. For example, the host can be selected so as to distribute a load (e.g., a CPU load, a network load, or a client load) among the different hosts. The intermediary server can send connection information to the target host so that the target host can accept a subflow connection from the requesting host. The target host can acknowledge that the connection information was received by sending an acknowledgement to the intermediary server. Additional servers can be configured to allow more direct connections between the requesting host and the target host. For example, a firewall server that performs security operations for the pool of hosts can be notified that the requesting host is allowed to access one or more of the pool of the hosts (e.g., the target host) without traversing through the intermediary server.

At 630, a multipath protocol packet can be sent from the intermediary server to the requesting host. The multipath protocol packet can add a subflow of the connection using an address of the target host. Specifically, the subflow can enable a path between the requesting host and the target host that does not traverse the intermediary server. A handshake can be performed between the requesting host and the target host to add the subflow to the connection to the service.

At optional 640, network traffic can be split on the connection between the subflow that does not traverse the intermediary server and the subflow that traverses the intermediary server. The subflows can be weighted so that the network traffic through each of the subflows can be managed. For example, the subflows can be weighted so that the higher latency path through the intermediary server is used less often than the lower latency path that omits the intermediary server. As one example, when the multipath protocol used is MPTCP, the weighting can be achieved by sending TCP window advertisements from the target host. The windows advertised for each subflow can be selected to create a desired ratio of traffic through each subflow. Retaining a predefined ratio of traffic through the subflow traversing the intermediary server can potentially assist accounting functions based on an amount of network traffic from the service while reducing the amount of latency to the service since most traffic can flow through the subflow that omits the intermediary server.

At optional 650, a virtual address of the service can be removed from the connection using another multipath protocol packet sent from the intermediary server to the requesting host. By removing the virtual address of the service from the connection, the subflow of the connection that traverses the intermediary server can be removed from the connection. For example, this can leave only the more direct subflow between the requesting host and the target host which can reduce a latency between the target host providing the service and the requesting host.

Figure 7:
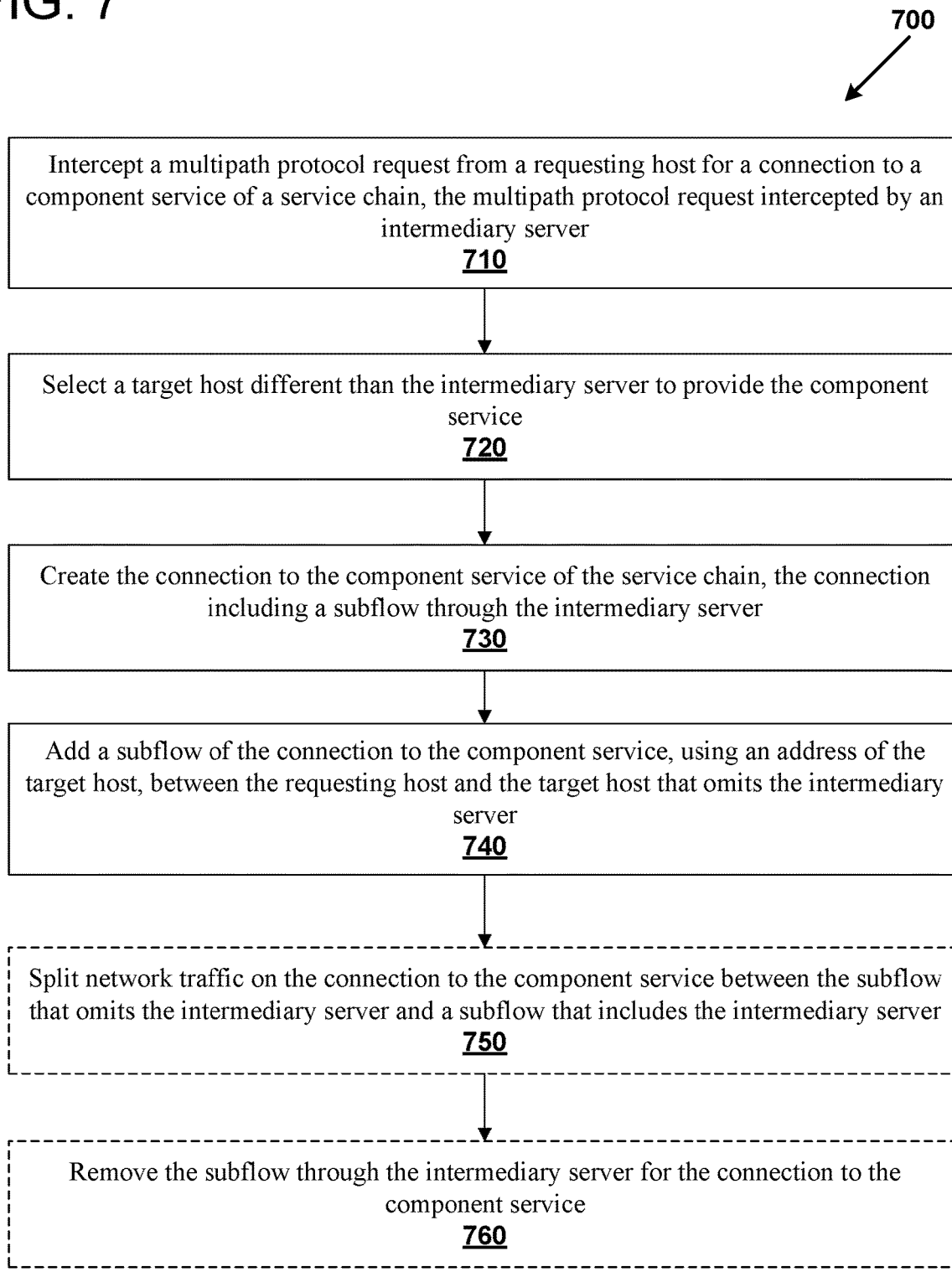
FIG. 7 is a flowchart of an example method for managing a network service using a multipath protocol, such as when the service is implemented using a service chain.

FIG. 7 is a flowchart of an example method 700 for managing a network service using a multipath protocol, such as when the service is implemented using a service chain. The method 700 can be implemented using the architecture 400, such as described above in reference to FIG. 4 as well as FIGS. 1-3, 5 and 6. As one example, computer-executable instructions for carrying out the method 700 can be stored in computer-readable memory (e.g., the memory 530) and the instructions can be executed by one or more processor(s) (e.g., the processor 510) to perform the method 700.

At 710, a multipath protocol request can be intercepted from a requesting host for a connection to a component service of a service chain. The service chain can include multiple component services that communicate with each to implement a higher-level service. For example, the component services can be pipelined so that the services operate concurrently. As another example, the component services can be sequenced so that one service begins after another service completes. The multipath protocol request can be intercepted by an intermediary server that is assigned a virtual address of the component service. The intermediary server can perform a handshake with the requesting host to create the connection to the component service. During the handshake, various parameters of the connection can be negotiated, such as whether encryption is to be used, what encryption key(s) to use (if encryption is used), the value of a shared secret, the value of a session identifier, and so forth.

The intermediary server can be a proxy for the component service by intercepting network traffic that flows between the requesting host and the component service.

At 720, a target host different than the intermediary server can be selected to provide the component service. For example, the target host can be selected from a pool of hosts. Operational criteria of the hosts can be maintained, such as central processing unit (CPU) loading, network usage, number of client connections, and so forth. The target host can be selected from the pool of hosts based on the operational criteria. For example, the host can be selected so as to distribute a load (e.g., a CPU load, a network load, or a client load) among the different hosts. The intermediary server can send connection information to the target host so that the target host can accept a subflow connection from the requesting host. The target host can acknowledge that the connection information was received by sending an acknowledgement to the intermediary server.

At 730, the connection to the component service of the service chain can be created. For example, the connection to the component service can be created at the conclusion of the handshake between the requesting host and the intermediary server. The connection can include a subflow through the intermediary server (e.g., using the virtual address of the component service). For example, network traffic from the requesting host to the target host can traverse the intermediary server when the traffic is sent using the subflow of the connection.

At 740, a subflow, using an address of the target host, can be added to the connection to the component service. For example, a multipath protocol packet adding the subflow of the connection can be sent from the intermediary server to the requesting host. The subflow can enable a path between the requesting host and the target host that does not traverse the intermediary server. A handshake can be performed between the requesting host and the target host to add the subflow to the connection to the component service.

At optional 750, network traffic can be split on the connection between the subflow that does not traverse the intermediary server and the subflow that traverses the intermediary server. The subflows can be weighted so that the network traffic through each of the subflows can be managed. For example, the subflows can be weighted so that the higher latency path through the intermediary server is used less often than the lower latency path that omits the intermediary server. As one example, when the multipath protocol used is MPTCP, the weighting can be achieved by sending TCP window advertisements from the target host. The windows advertised for each subflow can be selected to create a desired ratio of traffic through each subflow. Retaining a predefined ratio of traffic through the subflow traversing the intermediary server can potentially assist accounting functions based on an amount of network traffic from the component service while reducing the amount of latency to the service since most traffic can flow through the subflow that omits the intermediary server.

At optional 760, a virtual address of the component service can be removed from the connection using another multipath protocol packet sent from the intermediary server to the requesting host. By removing the virtual address of the component service from the connection, the subflow of the connection that traverses the intermediary server can be removed from the connection. For example, this can leave only the more direct subflow between the requesting host and the target host which can reduce a latency between the target host providing the component service and the requesting host.

Example Computing Environments

Figure 8:
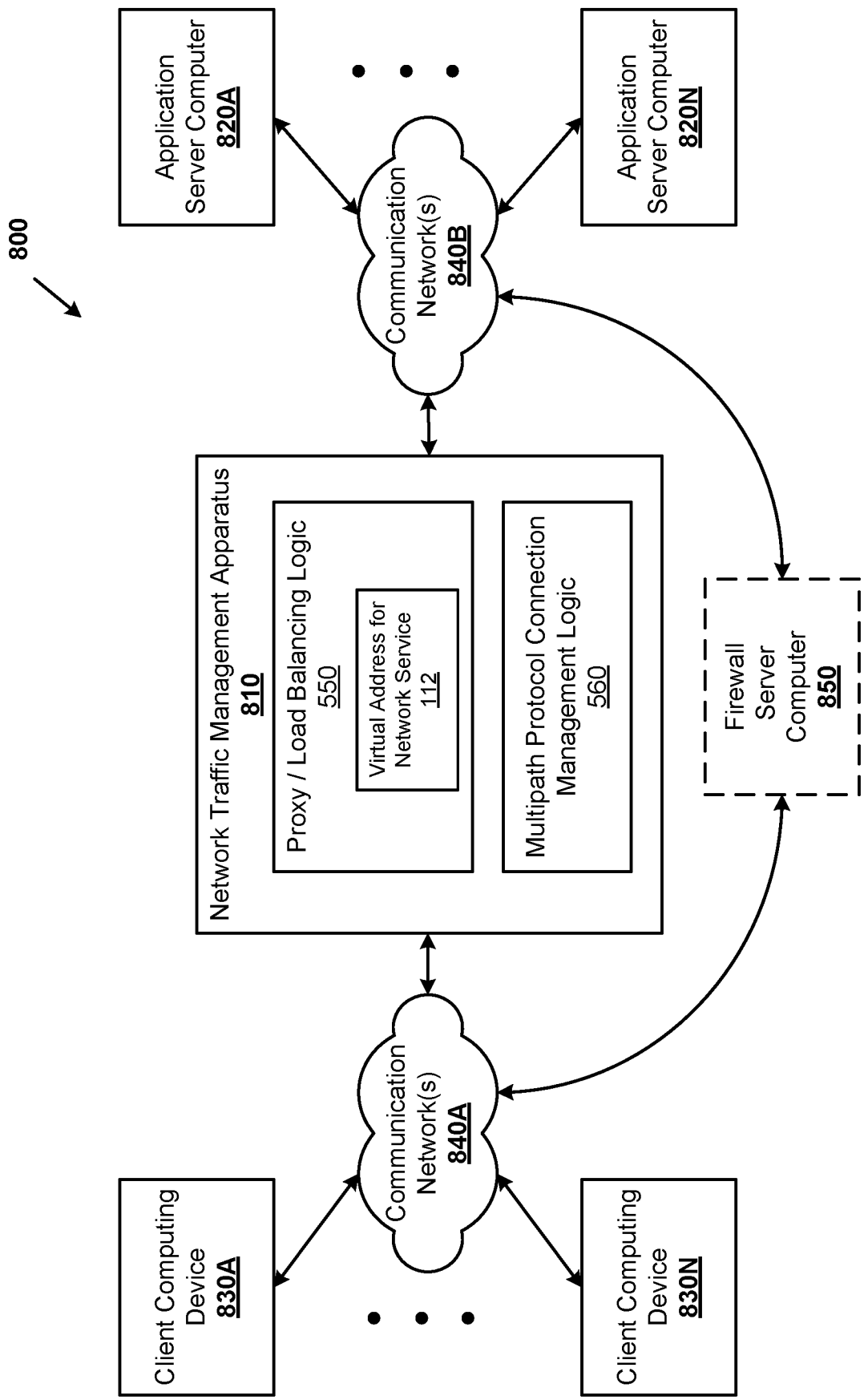
FIG. 8 is a block diagram of an example client-server architecture including logic for managing a network service using a multipath protocol.

FIG. 8 illustrates an example client-server architecture 800 (also referred to as a network traffic management system) that incorporates a network traffic management apparatus 810 that can be used for managing a network service using a multipath protocol. The client-server architecture 800 includes a network traffic management apparatus 810 that is coupled to one or more server computers (such as application server computers 820A-N and optional firewall server computer 850) and one or more client devices (such as client computing devices 830A-N) via one or more communication networks (such as the communication networks 840A and 840B). The server computers 820A-N and 850 can communicate with one or more additional server computer(s) that are accessible via the communication networks 840A. As one example, the communication network 840A can include a public network (e.g., the Internet) and devices attached to the network 840A can be accessed using public network addresses; the communication network 840B can include a private network and devices attached to the network 840B can be accessed using private network addresses.

The communication networks 840A-B can include various wired and/or wireless communication technologies, such as a local area network (LAN), a wide area network (WAN), an intranet, the Internet, a public switched telephone network (PSTN), and so forth. The devices connected to the communication networks 840A-B can communicate with each other using various communications protocols, such as transmission control protocol with Internet protocol (TCP/IP) over Ethernet and/or other customized or industry-standard protocols. The communication protocols can be used to transmit information over the networks 840A-B using packet-based messages (e.g., Ethernet-based packet data networks) and/or other application programming interfaces (APIs). An API is a programmatic interface (e.g., a set of methods and/or protocols) for communicating among different modules. The communication networks 840A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 810 is positioned in-line between the client computing devices 830A-N and the server computers 820A-N so that the network traffic management apparatus 810 can intercept network traffic flowing between the different networks 840A and 840B. In other examples, the network traffic management apparatus 810, the server computers 820A-N and 850, and the client devices 830A-N can be coupled together via other topologies. As one specific example, the server computers 820A-N can be integrated within the network traffic management system 800 (e.g., server computer functions can be implemented in software within one or more devices of the network traffic management apparatus 810). It should be appreciated by one of ordinary skill in the art having the benefit of the present disclosure, that the network topology illustrated in FIG. 8 has been simplified and that multiple networks and networking devices can be utilized to interconnect the various computing systems disclosed herein. Additionally, one or more of the devices of the client-server architecture 800 in these examples can be in a same or a different communication network including one or more public, private, or cloud networks, for example.

Figure 9:
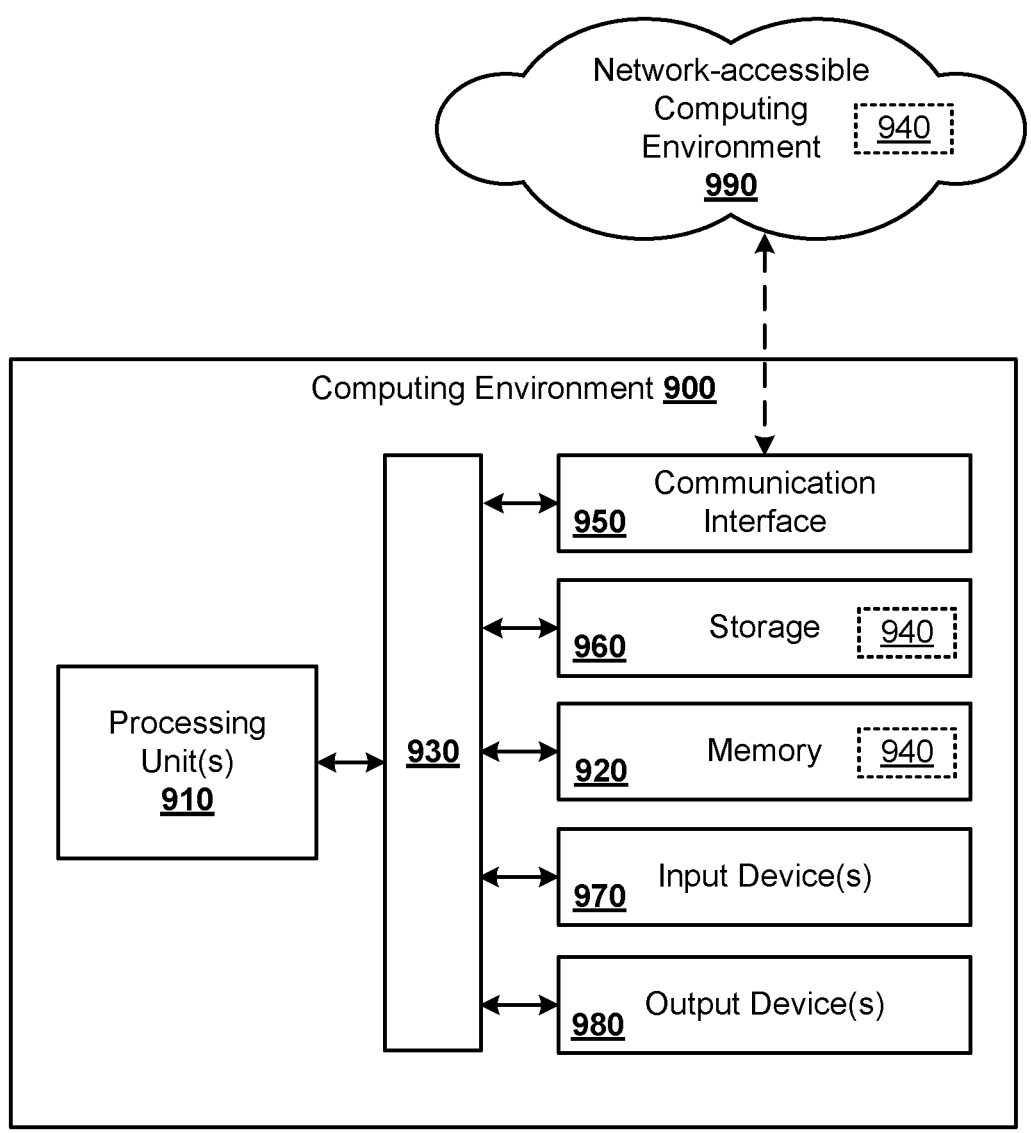
FIG. 9 is a block diagram of an example computing environment, such as can be used for a server computer.

Generally, the server computers 820A-N and 850, the client devices 830A-N, and the network traffic management system 800 can perform various computing tasks that are implemented using a computing environment, such as the computing environment described in more detail with respect to FIG. 9. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 830A-N can include any type of computing device that can exchange network data, such as mobile communication devices, laptop computers, desktop computers, tablet computers, virtual machines executing within a cloud-computer-based environment, and so forth. The client devices 830A-N can run interface applications, such as web browsers or standalone client applications, which may provide an interface to communicate with (e.g., make requests for, and receive content stored on) one or more of the server computers 820A-N and 850 via the communication network(s) 840A and 840B. The client devices 830A-N can further include an output device (such as a display screen or touchscreen (not illustrated)) and/or an input device (such as a keyboard (not illustrated)). Additionally, one or more of the client devices 830A-N can be configured to execute software code (e.g., JavaScript code within a web browser) in order to log client-side data and provide the logged data to the network traffic management apparatus 810 or the server computers 820A-N.

The server computers 820A-N and 850 can include any type of computing device that can exchange network data. For example, the server computers 820A-N and 850 can exchange network data with the client devices 830A-N and with each other. As another example, the server computers 820A-N can exchange communications along communication paths specified by application logic in order to facilitate a client-server application interacting with the client devices 830A-N. Examples of the server computers 820A-N can include application servers, database servers, access control servers, and encryption servers. Accordingly, in some examples, one or more of the server computers 820A-N process login and other requests received from the client devices 830A-N via the communication network(s) 840A and 840B according to the Hypertext Transfer Protocol (HTTP) or Hypertext Transfer Protocol Secure (HTTPS) application-layer protocol. A web application may be operating on one or more of the server computers 820A-N and transmitting data (e.g., files or web pages) to the client devices 830A-N (e.g., via the network traffic management apparatus 810) in response to requests from the client devices 830A-N. The server computers 820A-N can be hardware and/or software and may represent a system with multiple servers in a pool, which may include internal or external networks.

The optional firewall server computer 850 can execute a firewall application. A firewall is a network security system that implements a security policy that specifies how network traffic passing through the firewall is to be monitored and/or controlled. Firewalls can analyze fields within network packets from different layers of a network stack and make access control decisions based on the fields from the network packets. For example, a traditional firewall can analyze packet fields from network and transport layers (layers 3 and 4 of the Open Systems Interconnection (OSI) model) and a web application firewall (WAF) can analyze packet fields from the application layer (layer 7 of the OSI model) and make access control decisions based on the analyzed fields. As one example, a firewall can control (e.g., allow or block) traffic based on policies and/or rules that are configured on the firewall. Specifically, a firewall can allow traffic that matches rules on a permit list and can block traffic that matches rules on a deny list.

While the server computers 820A-N and 850 are illustrated as single devices, one or more actions of each of the server computers 820A-N and 850 may be distributed across one or more distinct network computing devices that together comprise one or more of the server computers 820A-N and 850. Moreover, the server computers 820A-N and 850 are not limited to a particular configuration. Thus, the server computers 820A-N and 850 may contain network computing devices that operate using a coordinated approach, whereby one of the network computing devices of the server computers 820A-N and 850 operate to manage or otherwise coordinate operations of the other network computing devices. Each of the server computers 820A-N and 850 can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 820A-N and 850 can operate within the network traffic management apparatus 810 itself rather than as a stand-alone server device communicating with the network traffic management apparatus 810 via communication network 840B. In this example, the one or more of the server computers 820A-N and 850 operate within the memory of the network traffic management apparatus 810.

The network traffic management apparatus 810 can include any type of computing device that can be used for managing network traffic. The network traffic management apparatus 810 can perform a number of functions, including providing network security, access control, load balancing network traffic across the server computers 820A-N, and/or accelerating network traffic associated with an application hosted by one or more of the server computers 820A-N, for example. Each of the functions can be performed by a service. The services can be incorporated into workloads that are executed by the network traffic management apparatus 810 For example, the network traffic management apparatus 810 can include a workload that is used to perform proxy and other services on behalf of the server 820A-N and to manage traffic between the clients 830A-N and the servers 820A-N. Additionally, the network traffic management apparatus 810 can include other network devices such as one or more routers or switches, for example.

The network traffic management apparatus 810 can include proxy and load balancing logic 550 and multipath protocol connection management logic 560 as described above with reference to FIG. 5 and also FIGS. 1-4 and 6-7. For example, the multipath protocol connection management logic 560 can be used to manage multipath protocol connections between hosts (e.g., the client devices 830A-N) requesting and hosts (e.g., application server computers 820A-N) providing the network service and hosts (e.g., the network traffic manager 810) that act as intermediaries between the requestors and the providers. Generally, the multipath protocol connection management logic 560 can be used to create and remove multipath protocol connections and can manage (e.g., add, remove, and change) subflows within the connections.

As a specific example, the client device 830A can address a request to the virtual address 112 of a network service, where the request is requesting a connection to the network service. The network traffic manager 810 can select the application server computer 820N to provide the network service. The network traffic manager 810 can create a multipath connection between the client device 830A and the network service using a subflow that traverses the network traffic manager 810. For example, the subflow can be associated with the virtual address 112 of the network service. The network traffic manager 810 can provide connection information to the application server computer 820N and the firewall server computer 850. For example, the network traffic manager 810 can request that the client device 830A be added to a permit list of the firewall server computer 850 so that the client device 830A can communicate with the servers 820A-N on the other side of the firewall. The network traffic manager 810 can add an additional subflow to the multipath connection, where the additional subflow does not traverse the network traffic manager 810. For example, the additional subflow can use an address of the application server computer 820N to more directly communicate with the client device 830A. The initial subflow through the network traffic manager 810 can be removed so that only the additional subflow remains and the latency associated with traversing the network traffic manager 810 can be removed.

While the network traffic management apparatus 810 is illustrated in this example as including a single device, the network traffic management apparatus 810 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 810. Additionally, the network traffic management apparatus 810 and/or the application(s) executed by the network traffic management apparatus 810 can be operative in a cloud-based computing environment. The application(s) can be executed within or as virtual machine(s) or virtual server(s) that can be managed in a cloud-based computing environment. For example, the application(s), and even the network traffic management apparatus 810 itself, can be located in virtual server(s) running in a cloud-based computing environment rather than being tied to one or more specific physical network computing devices. Also, the application(s) can be running in one or more virtual machines (VMs) executing on the network traffic management apparatus 810. Additionally, in one or more examples of this technology, virtual machine(s) running on the network traffic management apparatus 810 can be managed or supervised by a hypervisor. Additionally, one or more of the components that together comprise the network traffic management apparatus 810 can be standalone devices or integrated with one or more other devices or apparatuses, such as with one or more of the server computers 820A-N, for example.

Additionally, one or more of the components depicted in the client-server architecture 800, such as the network traffic management apparatus 810, server computers 820A-N, firewall server computer 850, or client computing devices 830A-N, for example, may be configured to operate as virtual instances on the same physical machine. In other words, one or more of the network traffic management apparatus 810, server computers 820A-N, firewall server computer 850, or client computing devices 830A-N may operate on the same physical device rather than as separate devices communicating through communication networks 840A and 840B. Additionally, there may be more or fewer network traffic management apparatuses, client computing devices, or server computers than illustrated in FIG. 8.

FIG. 9 illustrates a block diagram of a generalized example of a suitable computing environment 900 that can be used to implement the examples, techniques, and technologies described herein. For example, the computing environment 900 can be used to implement a network traffic management apparatus including an intermediary server that performs the disclosed techniques for managing network services using a multipath communications protocol.

The computing environment 900 includes at least one processing unit 910 and computer-readable memory 920, which are coupled together by an interconnect 930. The processing unit 910 executes computer-executable instructions. The processing unit 910 can include a general-purpose processor, a special-purpose processor, and combinations thereof. For example, the processing unit 910 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 920 stores software 940 implementing one or more innovations described herein, in the form of computer-executable instructions suitable for execution by the processing unit 910. Specifically, the memory 920 can be used to store computer-executable instructions, data structures, input data, output data, and other information. The memory 920 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 920 can include operating system software (not illustrated). Operating system software can provide an operating environment for other software executing in the computing environment 900 and can coordinate activities of the components of the computing environment 900.

The interconnect 930 is used to connect different components of the computing environment 900 together so that the processing unit 910 can communicate with the different components and/or so that the different components can communicate with each other. For example, the interconnect 930 can include a bus, controller, and/or a network. As one example, the interconnect 930 can include a host bridge (also referred to as a northbridge) for connecting the processing unit 910 to relatively high-speed components (such as the memory 920) and an input/output bridge (also referred to as a southbridge) for connecting to relatively lower-speed components (such as a communications interface 950) within the computing environment 900. In some examples, one or more components of the computing environment 900 can be integrated within or connected directly to the processing unit 910.

The computing environment 900 can include a communication interface 950 for communicating with another computing entity using a communication medium (e.g., a physical layer). The communication interface 950 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 950 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 950 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 8, a communication interface of the network traffic management apparatus 810 operatively couples to and communicates with the communication networks 840A and 840B so that the network traffic management apparatus 810 is coupled to and can communicate with the server computers 820A-N and the client computing devices 830A-N.

The computing environment 900 can include storage 960 that is used to store instructions for the software 940, data structures, and data, which can be used to implement the technologies described herein. The storage 960 can include electronic circuitry for reading and/or writing to removable or non-removable storage media using magnetic, optical, or other reading and writing system that is coupled to the processor. The storage 960 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 900.

The computing environment 900 can include input device(s) 970. For example, the input device(s) 970 can provide an input interface to a user of the computing environment 900 and/or to receive inputs from a physical environment. The input device(s) 970 can include a tactile input device (e.g., a keyboard, a mouse, or a touchscreen), a microphone, a camera, a sensor, or another device that provides input to the computing environment 900.

The computing environment 900 can include output device(s) 980. For example, the output device(s) 980 can provide an output interface to a user of the computing environment 900 and/or to generate an output observable in a physical environment. The output device(s) 980 can include a light-emitting diode, a display, a printer, a speaker, a CD-writer, or another device that provides output from the computing environment 900. In some examples, the input device(s) 970 and the output device(s) 980 can be used together to provide a user interface to a user of the computing environment 900.

The computing environment 900 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system (s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 910 and the network-accessible computing environment 890 that is linked through a communications network. In a distributed computing environment, program modules 840 (including executable instructions for managing a network service using a multipath communications protocol) can be located in both local and remote memory storage devices.

The term computer-readable media includes non-transient media for data storage, such as memory 920 and storage 960, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:
   intercepting a multipath protocol request from a requesting host for a connection to a service, the multipath protocol request intercepted by an intermediary server;
   selecting a target host different than the intermediary server to provide the service;
   sending a multipath protocol packet from the intermediary server to the requesting host, the multipath protocol packet adding a subflow of the connection using an address of the target host, the subflow enabling a path between the requesting host and the target host that does not traverse the intermediary server; and
   splitting a network flow on the connection between the subflow that does not traverse the intermediary server and a subflow that traverses the intermediary server.

2. The method of claim 1, wherein the multipath protocol request is addressed to a virtual address of the service, the virtual address being associated with and managed by the intermediary server.

3. The method of claim 1, further comprising removing a virtual address of the service from the connection using another multipath protocol packet sent from the intermediary server to the requesting host.

4. The method of claim 1, wherein the target host is selected from a plurality of hosts and the selection is based on a balance of loads among the plurality of hosts.

5. The method of claim 1, wherein:
   the subflow that traverses the intermediary server has a higher latency than the subflow that does not traverse the intermediary server; and
   the subflows are weighted so that the subflow that traverses the intermediary server is used less often than the subflow that does not traverse the intermediary server.

6. A system comprising one or more network traffic management modules, networking modules, or server modules, memory comprising programmed instructions stored thereon, and one or more processors configured to be capable of executing the stored programmed instructions to:
   intercept a multipath protocol request from a requesting host for a connection to a service, the multipath protocol request intercepted by an intermediary server;
   select a target host different than the intermediary server to provide the service;
   send a multipath protocol packet from the intermediary server to the requesting host, the multipath protocol packet adding a subflow of the connection using an address of the target host, the subflow enabling a path between the requesting host and the target host that does not traverse the intermediary server; and
   split a network flow on the connection between the subflow that does not traverse the intermediary server and a subflow that traverses the intermediary server.

7. The system of claim 6, wherein the multipath protocol request is addressed to a virtual address of the service, the virtual address being associated with and managed by the intermediary server.

8. The system of claim 6, wherein the one or more processors are configured to be capable of executing the stored programmed instructions to:
   remove a virtual address of the service from the connection using another multipath protocol packet sent from the intermediary server to the requesting host.

9. The system of claim 6, wherein the target host is selected from a plurality of hosts and the selection is based on a balance of loads among the plurality of hosts.

10. The system of claim 6, wherein:
    the subflow that traverses the intermediary server has a higher latency than the subflow that does not traverse the intermediary server; and
    the subflows are weighted so that the subflow that traverses the intermediary server is used less often than the subflow that does not traverse the intermediary server.

11. A non-transitory computer readable medium having stored thereon instructions comprising executable code that, when executed by one or more processors, causes the processors to:
    intercept a multipath protocol request from a requesting host for a connection to a service, the multipath protocol request intercepted by an intermediary server;
    select a target host different than the intermediary server to provide the service;
    send a multipath protocol packet from the intermediary server to the requesting host, the multipath protocol packet adding a subflow of the connection using an address of the target host, the subflow enabling a path between the requesting host and the target host that does not traverse the intermediary server; and
    split a network flow on the connection between the subflow that does not traverse the intermediary server and a subflow that traverses the intermediary server.

12. The computer readable medium of claim 11, wherein the multipath protocol request is addressed to a virtual address of the service, the virtual address being associated with and managed by the intermediary server.

13. The computer readable medium of claim 11, wherein the instructions further comprise executable code that, when executed by one or more processors, causes the processors to:
    remove a virtual address of the service from the connection using another multipath protocol packet sent from the intermediary server to the requesting host.

14. The computer readable medium of claim 11, wherein the target host is selected from a plurality of hosts and the selection is based on a balance of loads among the plurality of hosts.

15. The computer readable medium of claim 11, wherein:
    the subflow that traverses the intermediary server has a higher latency than the subflow that does not traverse the intermediary server; and
    the subflows are weighted so that the subflow that traverses the intermediary server is used less often than the subflow that does not traverse the intermediary server.

16. A network traffic management apparatus, comprising memory comprising programmed instructions stored thereon and one or more processors configured to be capable of executing the stored programmed instructions to:
    intercept a multipath protocol request from a requesting host for a connection to a service, the multipath protocol request intercepted by an intermediary server;
    select a target host different than the intermediary server to provide the service;

send a multipath protocol packet from the intermediary server to the requesting host, the multipath protocol packet adding a subflow of the connection using an address of the target host, the subflow enabling a path between the requesting host and the target host that does not traverse the intermediary server; and split a network flow on the connection between the subflow that does not traverse the intermediary server and a subflow that traverses the intermediary server.

17. The network traffic management apparatus of claim 16, wherein the multipath protocol request is addressed to a virtual address of the service, the virtual address being associated with and managed by the intermediary server.

18. The network traffic management apparatus of claim 16, wherein the one or more processors are further configured to be capable of executing the stored programmed instructions to:

remove a virtual address of the service from the connection using another multipath protocol packet sent from the intermediary server to the requesting host.

19. The network traffic management apparatus of claim 16, wherein the target host is selected from a plurality of hosts and the selection is based on a balance of loads among the plurality of hosts.

20. The network traffic management apparatus of claim 16, wherein:

the subflow that traverses the intermediary server has a higher latency than the subflow that does not traverse the intermediary server; and the subflows are weighted so that the subflow that traverses the intermediary server is used less often than the subflow that does not traverse the intermediary server.

* * * * *